US009489400B1

(12) United States Patent
Haitani (10) Patent No.: US 9,489,400 B1
(45) Date of Patent: Nov. 8, 2016

(54) INTERACTIVE ITEM FILTERING USING IMAGES (71) Applicant: Amazon Technologies, Inc., Reno, NV (US)

(72) Inventor: Robert Yuji Haitani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 208 days.

(21) Appl. No.: 14/304,607

(22) Filed: Jun. 13, 2014

(51) Int. Cl.
G06F 17/30 (2006.01)
G06Q 30/06 (2012.01)

(52) U.S. Cl.
CPC ... *G06F 17/30247* (2013.01); *G06F 17/30572* (2013.01); *G06F 17/30554* (2013.01); *G06F 17/30864* (2013.01); *G06F 17/30873* (2013.01); *G06F 17/30994* (2013.01); *G06Q 30/0643* (2013.01)

(58) Field of Classification Search
CPC .................. G06F 17/30572; G06F 17/30699; G06F 17/30705; G06F 17/30994; G06Q 30/00
USPC ............... 707/723, 688, 748, 752, 754, 758; 705/26.1, 27.1, 26.8
See application file for complete search history.

(56) References Cited

U.S. PATENT DOCUMENTS

| 7,657,457 | B2 * | 2/2010 | Razumov ............... G06Q 30/06 705/27.2 |
| 8,549,407 | B2 * | 10/2013 | O'Neil Garcia .. G06F 17/30873 715/733 |
| 8,751,966 | B2 * | 6/2014 | Weir .................... G06F 3/04847 715/767 |
| 8,949,252 | B2 * | 2/2015 | Chittar ................ G06F 17/3025 707/749 |
| 9,087,078 | B2 * | 7/2015 | Becherer ........... G06F 17/30247 |
| 2013/0088517 | A1 * | 4/2013 | McKenna ......... G06F 17/30274 345/635 |
| 2014/0279865 | A1 | 9/2014 | Kumar et al. |
| 2014/0344013 | A1 * | 11/2014 | Karty ................. G06Q 30/0201 705/7.29 |
| 2014/0344115 | A1 * | 11/2014 | Yatsuda ............ G06F 17/30572 705/26.63 |

OTHER PUBLICATIONS

NY Times—Front Row to Fashion Week, NYTimes.com, http://www.nytimes.com/newsgraphics/2013/09/13/fashion-week-editors-picks/, screen captured on Feb. 18, 2014, in 1 page.
NY Times—Front Row to Fashion Week, NYTimes.com, http://www.nytimes.com/newsgraphics/2013/09/13/fashion-week-editors-picks/, retrieved on Feb. 18, 2014 in 4 pages.
liteAccordion—a horizontal accordion plugin for jQuery, http://nicolahibbert.com/demo/liteAccordion/, retrieved on Feb. 18, 2014, in 6 pages.

* cited by examiner

*Primary Examiner* — Dangelino Gortayo
(74) *Attorney, Agent, or Firm* — Knobbe, Martens, Olson & Bear, LLP (57) ABSTRACT Systems and methods are provided for generating one or more user interfaces that enable filtering of the contents of a collection of items based on user interaction with item images. For example, an initial configuration can be generated including image thumbnails corresponding to each of a number of items. One or more of the thumbnails may be selected by a user to indicate a desired filter range. When a user interacts with the thumbnails, for example, by selecting a thumbnail or range of thumbnails, the initial configuration and/or an associated collection of items for presentation may be updated to present images of items in the selected filter range.

20 Claims, 8 Drawing Sheets

INTERACTIVE ITEM FILTERING USING IMAGES

BACKGROUND

Retailers and merchants involved in electronic commerce often provide user interfaces from which a user may search an electronic catalog for products available for purchase and/or browse products included in an electronic catalog. For example, the user may enter a term or keyword of interest to the user, and may then be presented with search results. These search results may include, for example, products that include the entered term or keyword in a product description associated with the product. Alternatively, a user may choose to browse items in a selected category or collection. A page or user interface will sometimes provide the user with narrowing category filters or criteria to revise a list of matching items when browsing or searching. In some user interfaces, such filter options may be presented as checkboxes, menu items, or fields that accept entry of numeric ranges. Filter options are typically presented prior to a user's search or browse request, and/or are presented in a separate portion of the user interface from the items to be filtered.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Due to the ever-increasing amount of information available to users of electronic catalog services and other network services, there is an ongoing need to implement user-friendly mechanisms to dynamically filter and search items (e.g., goods and/or services) represented by digital images within an electronic catalog or data store. Such images are often presented together in a user interface illustrating multiple items, for example, collections of items returned in response to a search or browse request of an electronic catalog, or items grouped together in a collection based on category, context, content, or other factors. However, such collections may contain large quantities of items, and therefore the collection may be overwhelming and/or unmanageable for a user to quickly narrow and/or filter the items to locate an item or subset of items of interest to the user. Thus, in some embodiments, representative items and/or images may be selected for presentation to the user. It may be intuitive and/or efficient for users to visually interact with item images to filter collections of items as opposed to filtering exclusively on item attributes or properties and/or selecting individual items. Users may also wish to interact with the images to view more information about corresponding items. Therefore, a need exists to filter the contents of a collection, or subset of a collection, of items to narrow the items to a subset of interest to the user in an efficient and interactive manner.

Generally described, aspects of the present disclosure relate to generating an initial configuration of a plurality of interactive images and updating the initial configuration in response to user interaction with the interactive images. For example, according to some embodiments, when a user interface or page is generated, as described herein, content may be selected to present in the user interface. The content may include interactive, selectable item images, such as item thumbnails or cropped portions of item images, that are each associated with a corresponding item. A user interaction with one or more of the item images and/or thumbnails may result in a dynamic update to the initial configuration. For example, a user interaction may include selecting a start thumbnail and/or an end thumbnail to specify a filter range of thumbnails and/or items. In some embodiments, thumbnails and/or items may be sorted by one or more attribute types and/or properties associated with the thumbnails and/or items. Thus, a user may interact with item images, thumbnails, and/or slices (described below) to efficiently filter a collection of items to a smaller subset of items.

A reduced representation of the image generated by cropping and/or scaling image data from at least one side of the image is sometimes referred to herein as a "slice" or "reduced representation" of an image. In some embodiments, a reduced representation can be produced by both cropping image data from at least one side of the image as well as scaling the cropped image. In some embodiments, an interactive configuration may be configured to rotate through a carousel of image slices based on the user input. More information regarding generating and presenting a slice of an image may be found in U.S. patent application Ser. No. 14/223,960 ("the '960 Application"), filed Mar. 24, 2014, entitled "EFFICIENT AND INTERACTIVE PRESENTATION OF ITEM IMAGES," which is hereby incorporated herein by reference in its entirety. Examples of slices and/or slices in interactive configurations, as used herein, may include various representations of content discussed in the '960 Application.

It will be appreciated that a full sized image as discussed herein can refer to an image actually displayed at full size, but could also refer to a full sized image that has been scaled according to display needs (such as for presentation on a mobile device screen), or which has been slightly cropped to fit in a window (such as to provide uniform dimensions/sizes for the images in a collection, among other reasons).

For example, embodiments for efficient and interactive item image presentation and filtering described herein may be particularly well suited for presenting images from certain types of item collections. In one embodiment, an interactive image presentation described herein may be used for displaying thumbnail images of collections of dresses. Each thumbnail can be cropped as described into a thin, vertical slice having a thinner width than the full sized thumbnail, and/or presented as a minimized thumbnail image, and still contain a large amount of information about the dress pictured. For example, a thin vertical slice of a dress image still contains information about the dress color, pattern, neckline, hem length, and waist features such as belts or color accents, among other characteristics. Although embodiments discussed herein are often described with respect to dress images, this is for illustrative purposes and is not meant to limit the scope of the presentation or filtering techniques described herein, which can be used to accommodate other types of images and items as well. For example, collections of coats, textiles, books, drapes, cars, suits, and lamps, to name a few, could also benefit from the efficient and interactive image filters discussed herein. In addition, although the slices are typically discussed herein as being generated by cropping the full sized image, in other embodiments, a slice can be a version of the full sized image that has been scaled or compressed in one or more directions. For example, a vertical slice of an image, in one embodiment, may be generated at least in part by horizontally scaling the image to have a smaller width than the full sized image. As will be appreciated, aspects of the present disclosure may also be applicable to filtering based on full-sized item images. Accordingly, the underlying items in many embodiments described herein are not limited to item types that present sufficient detail in a partial representation form to be appreciated by a user.

In some embodiments, an electronic catalog system, as described herein, may include or be in communication with a data store of information about items that may be listed for sale, lease, etc. by sellers, merchants and/or other users. The item information in this data store may be viewable by end users through a browsable or searchable electronic catalog in which each item may be described in association with a network page describing the item (which may be referred to herein as an item detail page). Each item detail page may include, for example, an item image and description, customer ratings, customer and professional reviews, sales rank data, lists of related items, and/or other types of supplemental data that may assist consumers in making informed purchase decisions. Users of the system may, in some embodiments, locate specific item detail pages within the electronic catalog by executing search queries, navigating a browse tree and/or using various other navigation techniques. As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

While a retail environment is often used as an example below, it will be appreciated that interactive image filters, as disclosed herein, may be used in a variety of environments other than a retail environment. For example, aspects of the present disclosure, in some embodiments, may be used and/or implemented to efficiently filter items within any user interface, page, video, electronic book and/or other electronic content. Without limitation, aspects of the present disclosure may be used for efficient item filtering with item images in social networking contexts, digital photo albums, digital news articles, and/or visual bookmarking contexts. For illustrative purposes, item images and interactive slices are often described below in the context of items listed in an electronic catalog. Alternatively, in other embodiments, item images and interactive slices that may be presented according to the systems and methods described herein may include advertisements, images in news articles, editorial content, videos, classified listings, auction listings and/or any other content that may be electronically presented to a user.

Figure 1A:
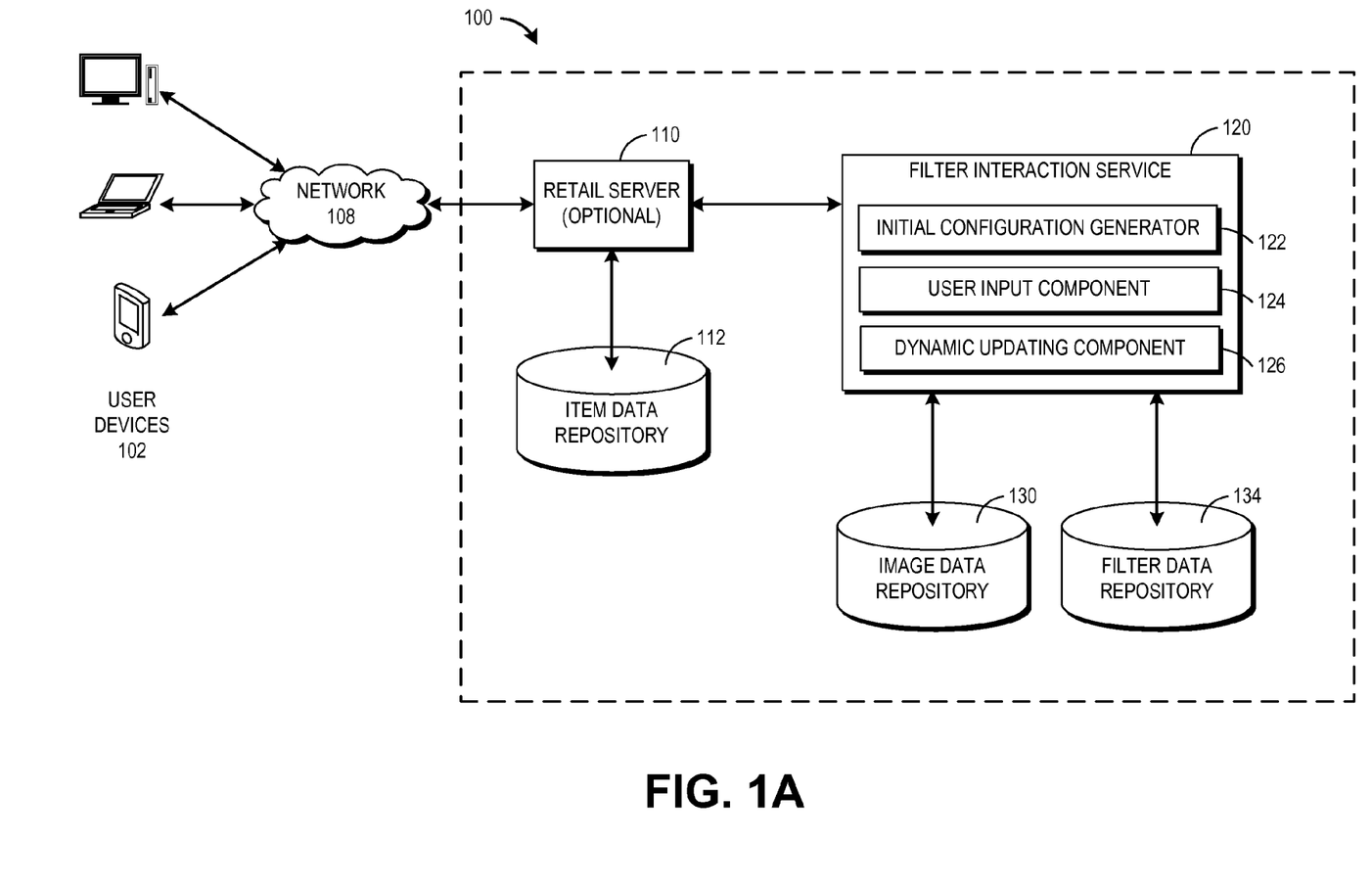
FIG. 1A is a block diagram depicting an illustrative operating environment for presenting users with efficient interactive item filtering with images.

The illustrative operating environment shown in FIG. 1A includes an electronic marketplace system 100 that enables users to browse and place orders for items (such as items listed in an electronic catalog). The marketplace system 100 may include one or more filter interaction services 120 that include an initial configuration generator 122, a user input component 124, and a dynamic updating component 126 stored in memory therein that may be used to implement various aspects of the present disclosure, such as generating an initial configuration for efficient filtering of items, analyzing user input with respect to the initial configuration, dynamically updating the initial configuration based on the user input, and other aspects discussed herein. The marketplace system 100 may also include one or more retail servers 110 that facilitate electronic browsing and purchasing of items, such as goods and/or services, using various user devices, such as user computing devices 102. Those skilled in the art will recognize that the user computing devices 102 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, and the like.

The retail server 110 may be connected to and/or in communication with an item data repository 112 that stores item information, metadata, and/or attributes regarding a number of items, such as items listed in an electronic catalog as available for browse and/or purchase via the retail server 110. Item data stored in item data repository 112 may include any information related to each item. For example, item data may include, but is not limited to, price, availability, title, item identifier, item images, item description, item attributes, keywords associated with the item, etc. In some embodiments, the item data repository 112 may store digital content items (e.g., audiobooks, electronic books, music, movies, multimedia works, etc.). The retail server 110 may also be connected to or in communication with a user data store (not illustrated) that stores user data associated with users of retail server 110, such as account information, purchase history, browsing history, item reviews and ratings, personal information, user preferences, location information, etc. The filter interaction service 120 may be connected to and/or in communication with an image data repository 130 that may be used to store a primary image associated with each of the number of items that can be displayed to represent the item in a filter and/or collection. For example, the primary image may be used to represent the item in a filter configuration for searching items, a collection of search results, browse results, a user-generated collection, or any other collection and/or filter. Multiple images can be associated with an item, for instance to aid a user in a purchase decision regarding the item.

In some embodiments, each of item data repository 112, image data repository 130 and/or filter data repository 134 may be local to filter interaction service 120, may be local to retail server 110, may be remote from both filter interaction service 120 and retail server 110, and/or may be a network-based service itself. The item data repository 112, image data repository 130 and/or filter data repository 134 may be embodied in hard disk drives, solid state memories, any other type of non-transitory computer-readable storage medium, and/or a file, a database, a relational database, in-memory cache, and/or stored in any such non-transitory computer-readable medium accessible to the retail server 110. The item data repository 112, image data repository 130 and/or filter data repository 134 may also be distributed or partitioned across multiple local and/or storage devices without departing from the spirit and scope of the present disclosure. In the environment shown in FIG. 1, a user of the marketplace system 100 may utilize a user computing device 102 to communicate with the retail server 110 via a communication network 108, such as the Internet or other communications link. The network 108 may be any wired network, wireless network or combination thereof. In addition, the network 108 may be a personal area network, local area network, wide area network, cable network, satellite network, cellular telephone network, etc. or combination thereof. In addition, the network 108 may be a personal area network, local area network, wide area network, over-the-air broadcast network (e.g., for radio or television), cable network, satellite network, cellular telephone network, or combination thereof. For example, the network 108 may be a publicly accessible network of linked networks, possibly operated by various distinct parties, such as the Internet. In some embodiments, the network 108 may be a private or semi-private network, such as a corporate or university intranet. The network 108 may include one or more wireless networks, such as a Global System for Mobile Communications (GSM) network, a Code Division Multiple Access (CDMA) network, a Long Term Evolution (LTE) network, or some other type of wireless network. The network 108 can use protocols and components for communicating via the Internet or any of the other aforementioned types of networks. Protocols and components for communicating via the Internet or any of the other aforementioned types of communication networks are well known to those skilled in the art and, thus, are not described in more detail herein.

The marketplace system 100 is depicted in FIG. 1A as operating in a distributed computing environment including several computer systems that are interconnected using one or more computer networks. The marketplace system 100 could also operate within a computing environment having a fewer or greater number of devices than are illustrated in FIG. 1A. Thus, the depiction of marketplace system 100 in FIG. 1A should be taken as illustrative and not limiting to the present disclosure. For example, the marketplace system 100 could implement various Web services components and/or peer-to-peer network configurations to implement at least a portion of the processes described herein.

In brief, the retail server 110 is generally responsible for providing front-end communication with various user devices, such as a user computing device 102, via network 108. The front-end communication provided by the retail server 110 may include generating text and/or graphics, possibly organized as a user interface using hypertext transfer or other protocols in response to information inquiries received from the various user devices. The retail server 110 may obtain information on available goods and services from one or more data stores, such as item data repository 112, as is done in conventional electronic commerce systems. In certain embodiments, the retail server 110 may also access item data from other data sources, either internal or external to marketplace system 100. While marketplace system 100 is often described herein with respect to an embodiment in which the filter interaction service 120 communicates with a retail server 110 in a retail environment, in other embodiments, a filter interaction service 120 may operate independently of a retail environment. In some such embodiments, the filter interaction service 120 may communicate with a user computing device 102 without the presence of a retail server, or may communicate with another server responsible for providing front-end communication with the computing device 102. In other embodiments, the retail server 110 may include or implement a filter interaction service, as described herein, such that a separate filter interaction service 120 may not be present in certain embodiments.

Figure 1B:
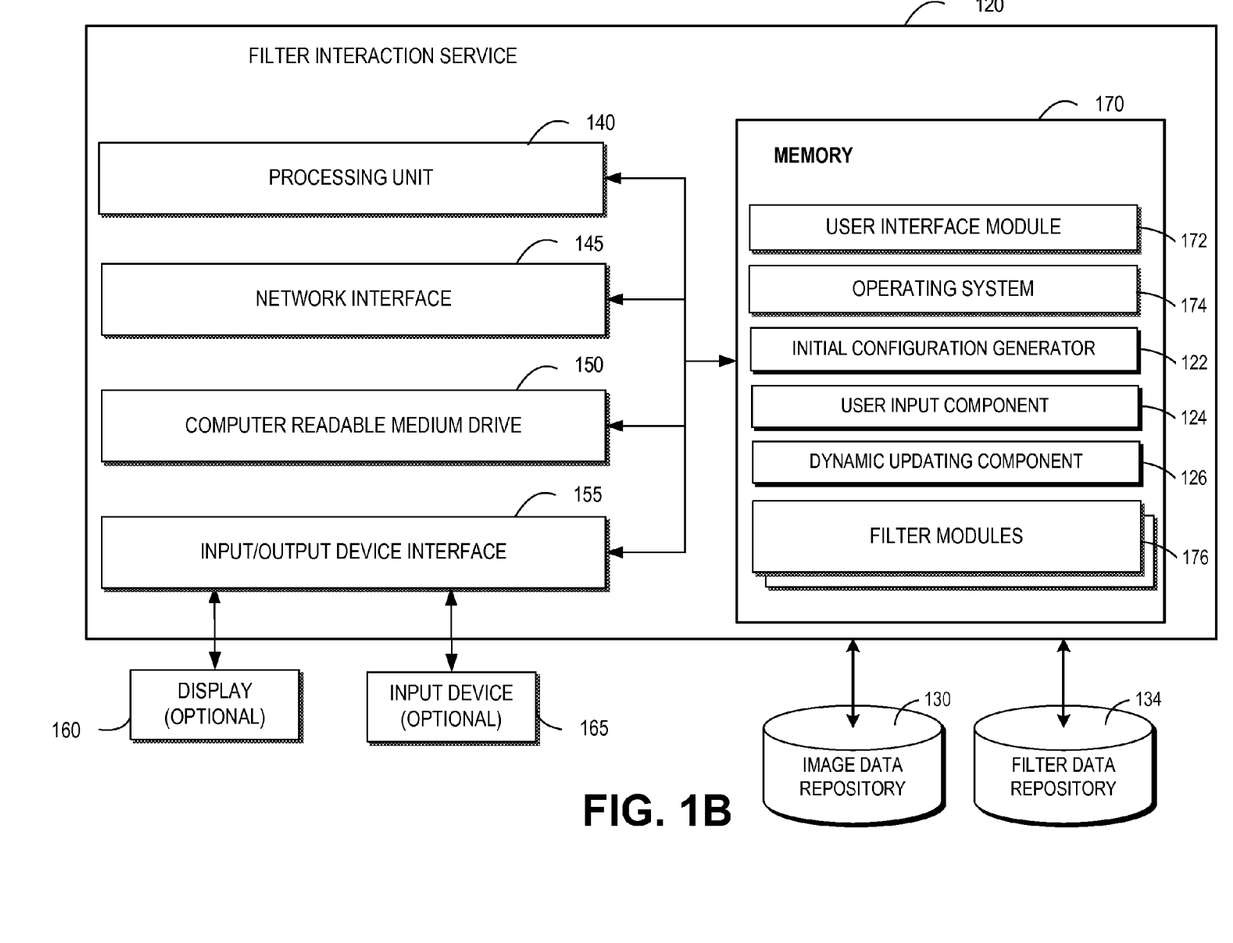
FIG. 1B depicts a general architecture of a computing device providing a filter interaction service for efficient and interactive filtering of items with images.

FIG. 1B depicts a general architecture of a computing system (referenced as filter interaction service 120) that generates an initial configuration for a dynamic image filter and updates at least a portion of the initial configuration based on user interaction with the initial configuration. The general architecture of the filter interaction service 120 depicted in FIG. 1B includes an arrangement of computer hardware and software components that may be used to implement aspects of the present disclosure. The filter interaction service 120 may include many more (or fewer) elements than those shown in FIG. 1B. It is not necessary, however, that all of these generally conventional elements be shown in order to provide an enabling disclosure. As illustrated, the filter interaction service 120 includes a processing unit 140, a network interface 145, a computer readable medium drive 150, an input/output device interface 155, a display 160, and an input device 165, all of which may communicate with one another by way of a communication bus. The network interface 145 may provide connectivity to one or more networks or computing systems. The processing unit 140 may thus receive information and instructions from other computing systems or services via the network 108. The processing unit 140 may also communicate to and from memory 170 and further provide output information for an optional display 160 via the input/output device interface 155. The input/output device interface 155 may also accept input from the optional input device 165, such as a keyboard, mouse, digital pen, microphone, touch screen, gesture recognition system, voice recognition system, etc.

The memory 170 may contain computer program instructions (grouped as modules or components in some embodiments) that the processing unit 140 executes in order to implement one or more embodiments. The memory 170 generally includes RAM, ROM and/or other persistent, auxiliary or non-transitory computer-readable media. The memory 170 may store an operating system 174 that provides computer program instructions for use by the processing unit 140 in the general administration and operation of the filter interaction service 120. The memory 170 may further include computer program instructions and other information for implementing aspects of the present disclosure. For example, in one embodiment, the memory 170 includes a user interface module 172 that generates user interfaces (and/or instructions therefor) for display upon a computing device, e.g., via a navigation interface such as a browser or application installed on the computing device. In addition, memory 170 may include or communicate with an auxiliary image data repository 130, filter data repository 134 and/or one or more other data stores, as discussed above with reference to FIG. 1A.

In addition to and/or in combination with the user interface module 172, the memory 170 may include an initial configuration generator 122, a user input component 124 and a dynamic updating component 126 that may be executed by the processing unit 140. In one embodiment, the initial configuration generator 122, user input component 124 and dynamic updating component 126 individually or collectively implement various aspects of the present disclosure, e.g., generating an initial configuration for a dynamic image filter, analyzing user input with respect to the initial configuration, dynamically updating the initial configuration based on the user input, etc., as described further below. While the initial configuration generator 122, user input component 124, dynamic updating component 126 and filter modules 176 are shown in FIG. 1B as part of the filter interaction service 120, in other embodiments, all or a portion of an initial configuration generator, a user input component, a dynamic updating component and/or one or more filter modules 176 may be implemented by the retail server 110 and/or another computing device. For example, in certain embodiments of the present disclosure, the retail server 110 may include several components that operate similarly to the components illustrated as part of the filter interaction service 120, including a user interface module, initial configuration generator, user input component, dynamic updating component, one or more filter modules, processing unit, computer readable medium drive, etc. In such embodiments, the retail server 110 may communicate with an image data store, such as image data repository 130, and the filter interaction service 120 may not be needed in certain embodiments. Further, although certain examples are illustrated herein in the context of a retail server 110, this is not a limitation on the systems and methods described herein. It will also be appreciated that, in some embodiments, a user device may implement functionality that is otherwise described herein as being implemented by the elements and/or modules of the filter interaction service 120. For example, the user computing device 102 may receive code modules or other instructions from the retailer server 110 and/or filter interaction service 120 via the network 108 that are executed by the user computing device 102 to implement various aspects of the present disclosure.

Figure 2:
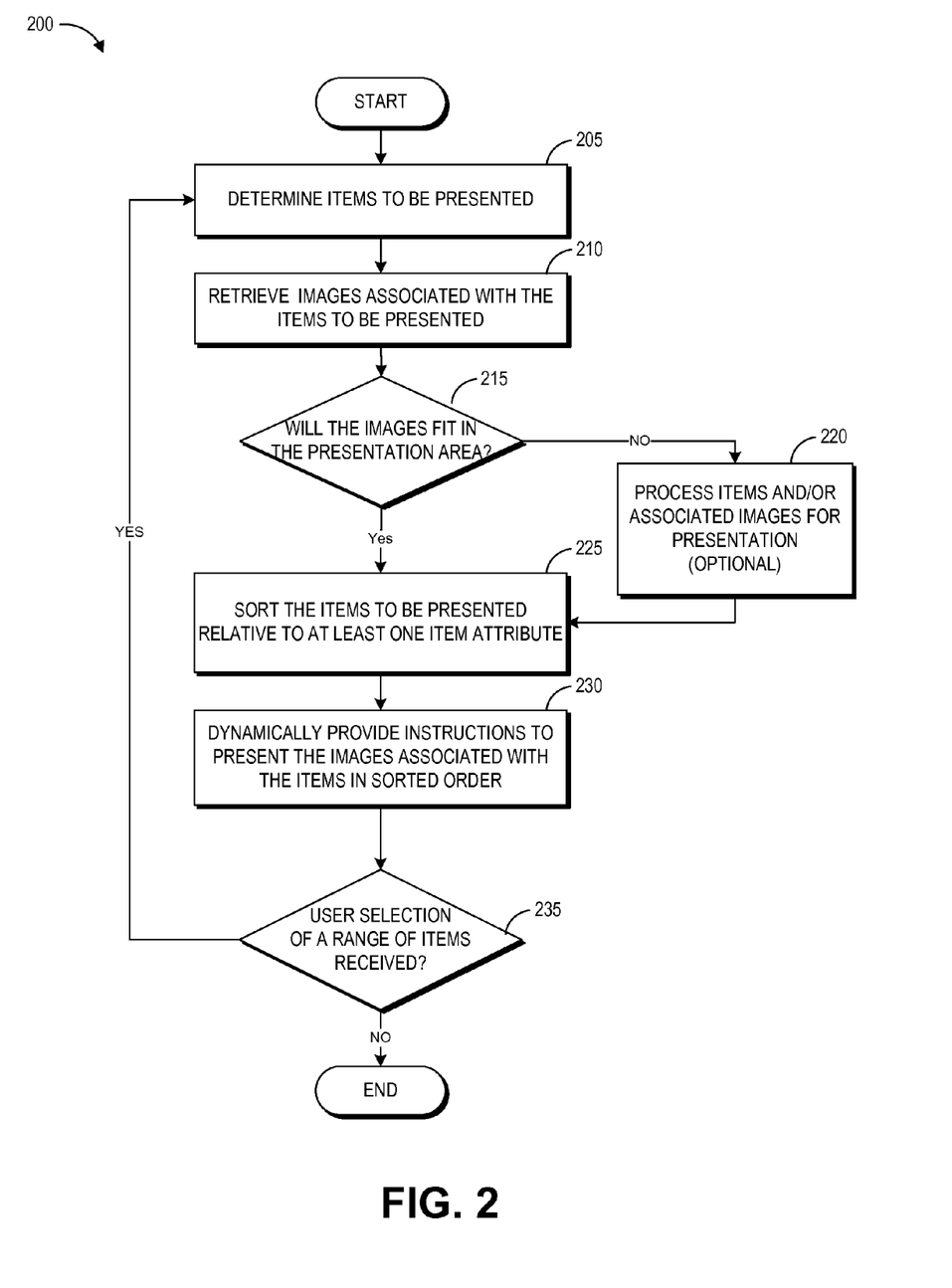
FIG. 2 is a flow diagram of an illustrative method implemented at least in part by a filter interaction service for generating a page or user interface that includes an interactive configuration of item images for filtering.

FIG. 2 is a flow diagram of an illustrative method 200 implemented at least in part by the filter interaction service 120 for generating a page or user interface that includes an interactive configuration of item images for filtering. While the illustrative method will be described below as being implemented by the components of filter interaction service 120, in other embodiments, a similar method may be implemented by the retail server 110 or other computing system responsible for providing front-end communication with a user computing device. As discussed above, illustrative method 200 may be implemented entirely by a user device, such as user computing device 102, in some embodiments. While a page is used as an example below, the illustrative method 200 may, in other embodiments, include generating a user interface and/or displayable file other than a page.

The illustrative method 200 begins at block 205, where the initial configuration generator 122 determines items to be presented. This can occur, for example, when the filter interaction service receives a page request from a user device, such as computing device 102. This can also occur, for example, when the illustrative method 200 has performed a loop and returns to block 205. Alternatively, the filter interaction service may receive a request for a page or part of a page to be generated from the retail server 110. In a retail example, a user may navigate to the clothing section and/or page associated with a retail store and request to view dresses. As a result, the filter interaction service may receive the request and determine items to be presented based at least in part on the request and item information retrieved from the item data repository 112. As one example, the items to be presented may be items responsive to a search query received from the user. As another example, the items may be all items in a category, collection, list or portion of a browse tree. In instances in which block 205 is reached after a user has already made a prior filter selection, the items to be presented may be the items that match one or more prior filter selections or other criteria selected by the user.

At block 210, the filter interaction service retrieves a number of images associated with the collection of items to be presented, such as by retrieving the images from image data repository 130. For example, the filter interaction service may retrieve a primary image associated with each item to be presented. Alternatively, the filter interaction service may dynamically select an image for each item from among multiple stored images based on a variety of criteria, depending on the embodiment, user preferences, display limitations, context of the page, item type, image quality, an automated image analysis, and/or other factors.

At decision block 215, the filter interaction service may determine whether the item images will fit in the presentation area. The filter interaction service may retrieve and/or determine the presentation area size, such as the width of the presentation area, for example. Each item image may have an associated length, width, and/or size. Thus, filter interaction service may calculate and/or determine whether the item images will fit based at least in part on the total size of the item images (or the size of the partial item representations to be displayed in the given embodiment) and the size of the presentation area.

At block 220, if the item images will not fit within the presentation area, the items and/or associated item images for presentation may be optionally processed. Optional processing may include selecting representative item images or items. For example, if the items to be presented include 100,000 items, then the retrieved images will most likely not fit within the presentation area. As a result, in the example, the filter interaction service may select representative item images, such as fifty or hundred item images, for the 100,000 items that will collectively fit within the presentation area. Alternatively or additionally, the retrieved item images may be dynamically resized to fit within the presentation area. In some embodiments, the filter interaction service may expand the item images onto additional pages and/or may allow for scrolling of the item images to display item images not currently displayed. For example, the item images currently viewable by a user may scroll and/or animate based on a user selection to display additional item images. Furthermore, item images may be cropped and/or sliced, as described above with reference to the '960 Application and below with reference to FIGS. 3B and 5A-D.

In some embodiments, the filter interaction service may use one or more techniques and/or methods to select representative items and/or representative item images. The filter interaction service may first determine the number of item images that will fit within the presentation area based at least in part on a predetermined and/or average size of the item images. For example, in an embodiment in which the filter interaction service presents partial image representations having a predetermined minimum width, the filter interaction service may determine the maximum output width of the entire presentation area (such as a width of a user interface window, a portion of a user interface in which images will be populated, or a display width of a screen or other output device), then determine how many partial image representations will fit within that area. The filter interaction service may additionally consider a minimum spacing desired between partial image representations.

In some embodiments, the filter interaction service may randomly select item images to represent the set of items and/or item images. For example, suppose that the filter interaction service has determined that of 1,000 items in a collection, only a maximum of 50 will fit in the presentation area, given a predetermined minimum spacing and/or minimum image width. In this example, according to one embodiment, the filter interaction service may sort the 1,000 items based on one or more item attributes, then select every twentieth item to have that item's image presented as a representative item image. One advantage of such an approach is that the relative distribution of items among different attribute values of the sorted attribute type may still be apparent to the user from the presented representative item images. In some embodiments, the filter interaction service may group the item images by an attribute type and/or value to select a number of item images representative of each group to fit within the presentation area. For example, attribute types such as color, style, price, or any other attribute associated with an item may be used to determine representative item images by selecting one item from each of a number of clusters or groups that form within a sorted collection.

In some embodiments, the number of representative item images for each group may be normalized to reflect a proportional number of representative item images for each group. For example, if the presentation area will fit ten item images, and a set of item images includes ten green dress images, thirty yellow dress images, and sixty blue dress images, then the filter interaction service may select one green dress image, three yellow dress images, and six blue dress images as representative item images. In some embodiments, the filter interaction service may determine preferred representative item images based on purchase data, user preferences, popularity or any other metadata associated with the item images and/or items. Since representative item images may be selected, subsequent filter selections including the representative item images may cause an expansion and/or inclusion of additional associated item images, which is described further below with reference to block 235.

At block 225, if the item images will fit within the presentation area, the filter interaction service sorts and/or groups the item images to be presented relative to at least one item attribute associated with the item images and/or items. For example, a user may select an item attribute to sort the item images. Non-limiting examples of item attributes may include length, style, price, pattern, color, material, keyword, brand, and/or any property and/or metadata associated with an item. The filter interaction service sorts and/or groups the item images based at least in part on one item attribute, for example, sorting items by price. In some embodiments, the sorted order and/or grouping of items may be at least partially cached to reduce the calculation and/or determination time required to determine a sorted order and/or grouping. For example, before a sort and/or grouping option is selected by a user, the filter interaction service may have a default order and/or configuration pre-cached for a first presentation to a user, which may depend on the category of items being viewed.

At block 230, the filter interaction service dynamically provides instructions to present the item images associated with the items in a sorted order. For example, based at least in part on the determined sorted order, the provided instructions may order the item images for presentation, such as a list and/or series of item images, as described below with reference to FIGS. 4A-D and/or FIGS. 5A-D. The provided instructions generated by the filter interaction service may include code (e.g., markup language, JAVASCRIPT®, JAVA®, or the like), data (e.g., Extensible Markup Language ("XML"), JavaScript Object Notation ("JSON"), or the like), and/or other instructions to direct a client device, such as a browser, to update its display. In some embodiments, the filter interaction service may be executed by a user computing device and the provided instructions may directly update the display of the user computing device.

At decision block 235, the user input component 124 and/or the filter interaction service may determine whether a user selection for a range of item images has been received. If a user selection has been received, the illustrative method 200 can loop back to block 205 to dynamically update the items and/or item images to be presented. In some embodiments, where a start and/or end item image has been received via a user selection, the filter interaction service may filter and/or determine items to be presented based at least in part on the start and/or end item image. For example, if a hundred item images are displayed for filtering, and the tenth and twentieth item images are received as a start and ending item image, respectively, then the filter interaction service may filter the items for display to include a subset of the items corresponding to the tenth through the twentieth item images. If one or more of the tenth through the twentieth item images correspond to representative item images, for example, then the filter interaction service may dynamically retrieve additional item images for presentation that are associated with the other representative item images not previously included in the presentation area. For example, if a single representative green dress item image was included in the filter selection, then the filter interaction service may determine additional green dress item images for presentation on the next loop. In other words, the attribute values with respect to a given attribute type of the selected representative item images may be used to determine subsequent items and/or item images for presentation.

For example, suppose that a user previously selected to sort a number of representative items by price, then selected a starting representative item image corresponding to a $20 item and an ending representative item image corresponding to a $50 item. In response, according to one embodiment, the filter interaction service may retrieve items attribute values associated with all items that match any criteria previously set by the user (including items that did not have item images presented to the user previously) in order to determine a new set of items within the price range of $20-50. Thus, a user may efficiently browse and/or view a large number of item images through representative item images within a limited presentation area. Upon returning to block 205 and repeating the illustrative method, the filter interaction service may enable the user to sort and/or filter the resulting subset of items based on one or more different item attributes than previously selected. Various aspects of filtering and more detail regarding the illustrative method of FIG. 2, according to some embodiments, are further described below with reference to FIGS. 4A-D and 5A-D. In some embodiments, a user selection of a range of item images may include an undo or return selection. For example, in the example of filtering from one hundred items to ten items, an undo selection received by the filter interaction service may cause the presentation of the previous 100 items for display.

While FIG. 2 has been described above with reference to an embodiment in which interactive image display configurations are generated and updated by the filter interaction service 120, in other embodiments, all or a portion of an efficient and interactive image display may be generated and/or updated by the computing device 102. For example, executable code included in a page or associated with a user interface may, when executed by the computing device 102, cause the computing device 102 to generate and/or update an efficient and interactive image display. As an example, a script or other executable code may be included in a page sent by the retail server 110 to the computing device 102 for display by a browser or other application executed by the computing device 102. Upon a user selection of a given selectable option within the page, the script or other executable code may cause the computing device 102 to generate and/or update an interactive image display, as described herein.

Figure 3A:
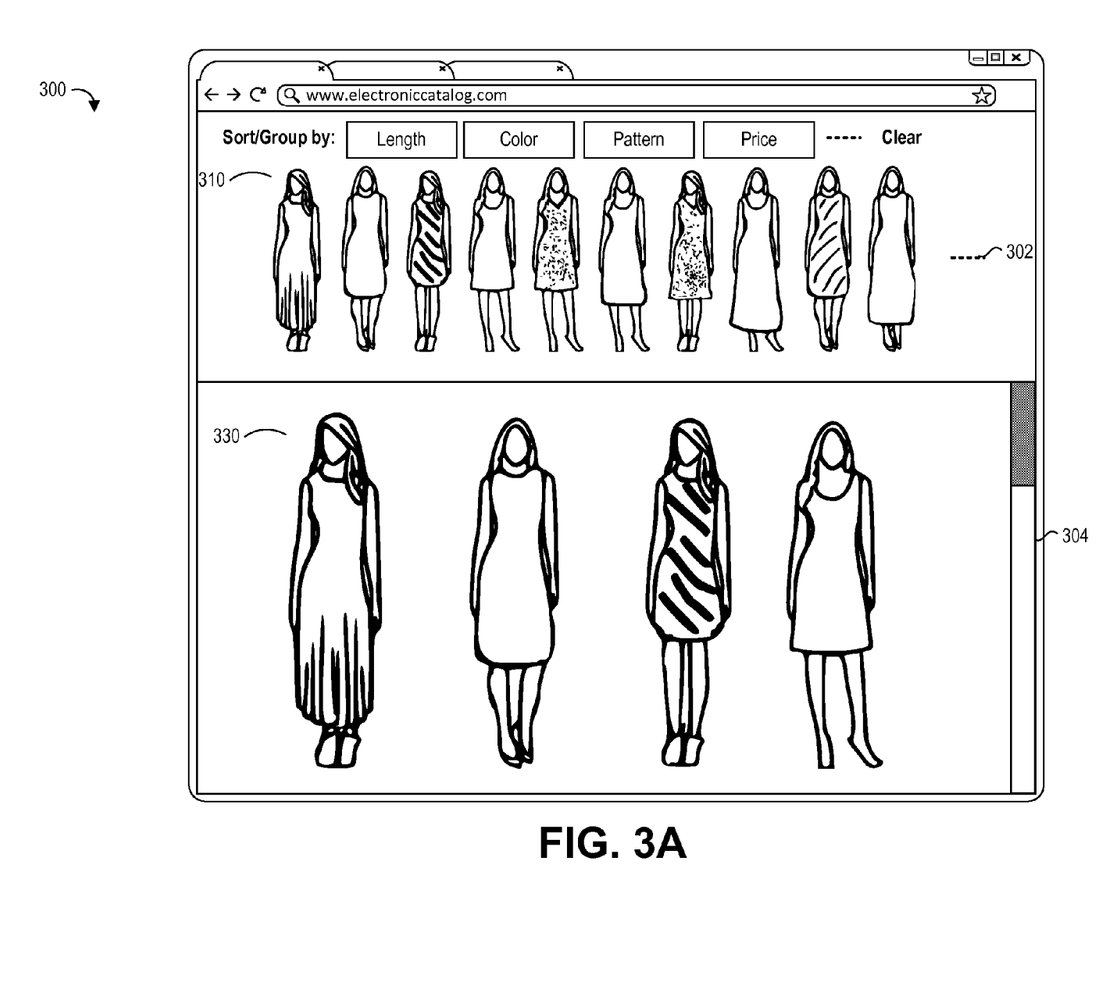
FIG. 3A is an illustrative user interface generated at least in part by a filter interaction service that includes an interactive configuration of item images for filtering.

FIG. 3A is an illustrative user interface 300 generated at least in part by the filter interaction service 120 that includes an interactive section 310 and an item display section 330. The interactive section and/or configuration 310 can be used to reduce a number of items presented in the item display section 330. A user interface similar to user interface 300 may be presented in a variety of circumstances, such as when presenting search results to a user or when enabling a user to browse a category of items. The interactive section 310 may display item images, here dresses, in a minimized and/or smaller size format. As will be appreciated, the interactive section 310 allows a significantly larger number of items to be presented in a relatively limited display area as compared to if full-sized images were displayed for every item. For example, the ellipsis 302 is a representation that indicates more item images may be displayed than is currently illustrated and/or that a user may navigate to other items images not currently displayed (e.g., by scrolling). In addition to the large number of items capable of being simultaneously presented for display, the interactive section 310 also allows a user to more easily compare differences between the items and to get a sense of the overall item collection or group as a whole.

The interactive section 310 and item display section 330 can be navigated and/or interacted with by a user as described above with respect to FIGS. 4A-4D and 5A-D in various embodiments. For example, interaction by a user with respect to interactive section 310 (such as by filtering) may cause updates to the corresponding item display section 330 (such as by dynamically updating to match filter selections). Example user interactions and input methods are described in more detail below. In some embodiments, item display section 330 may include a navigation element 304. The navigation element 304 may allow a user to navigate item display section 330 to view other items and/or item images not currently displayed in item display section 330.

Figure 3B:
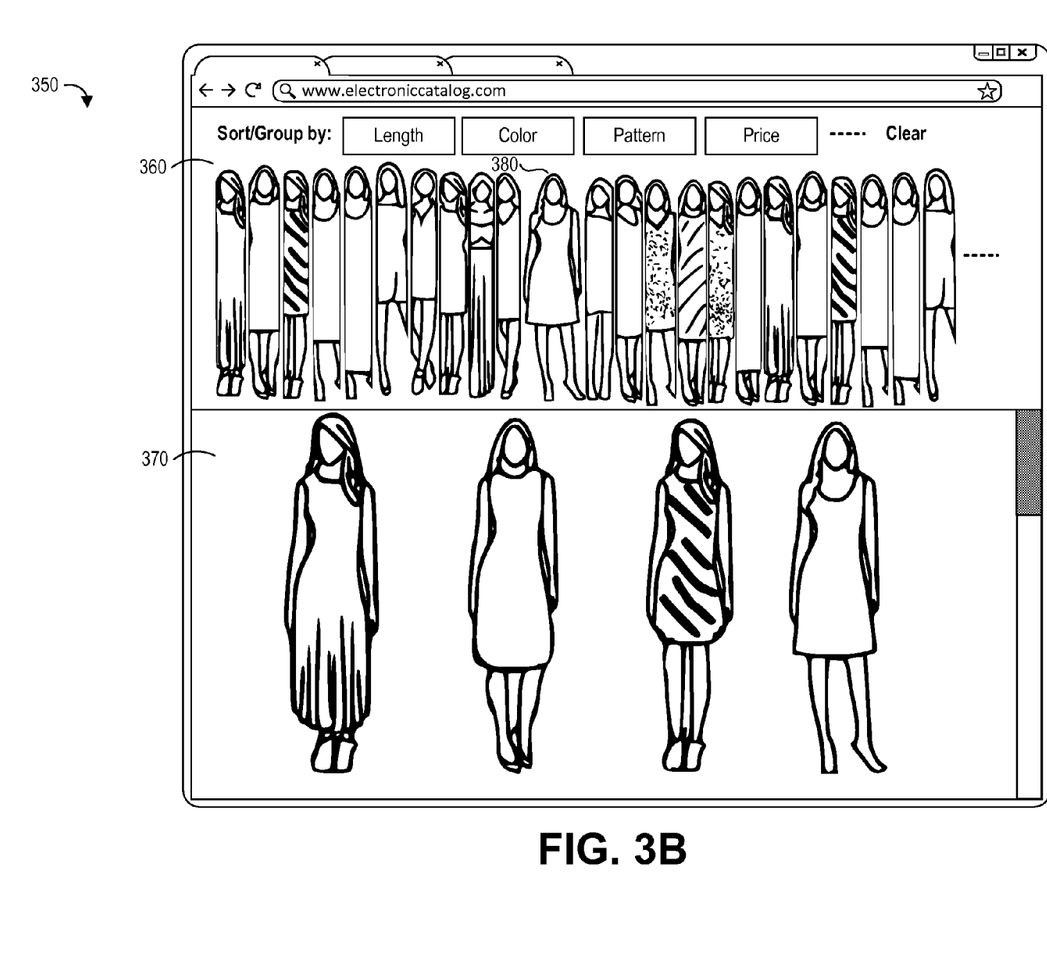
FIG. 3B is another illustrative user interface generated at least in part by a filter interaction service that includes an interactive configuration of item images for filtering.

FIG. 3B is another illustrative user interface 350 generated at least in part by the filter interaction service 120 that includes an interactive section 360. As illustrated, user interface 350 includes many elements similar to user interface 300 discussed above. Interaction section 360 includes slices, which allow for the presentation of many more item images than if only full-width images are presented. The interactive section 360 and item display section 370 can be navigated and/or interacted with by a user as described above with respect to FIGS. 4A-4D and 5A-D in various embodiments. In some embodiments, user input (such as a mouse and/or hover over) can cause presentation of full size dress image 380, contraction of the presentation of one or both adjacent images toward slice size, and no change to an interactive section 360 outside of the predetermined distance used to determine a set of interacted-with item images, according some embodiments.

Figure 4A:
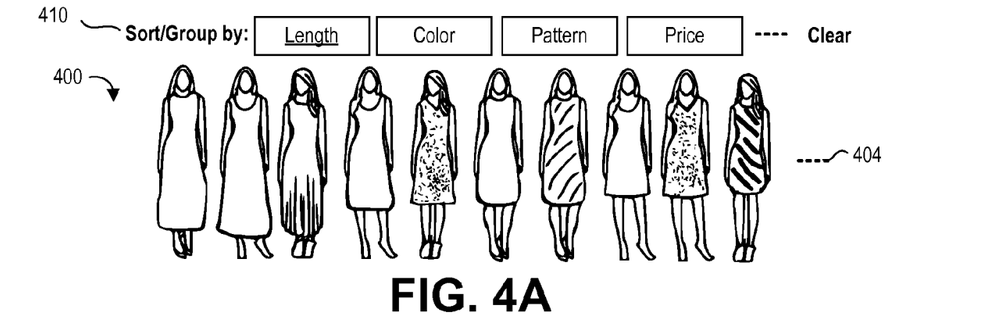
FIGS. 4A-D illustrate an example sequence of partial user interface representations illustrating filtering based on user interaction with an interactive configuration of item images, according to some embodiments.

FIGS. 4A-D illustrate an example of a sequence of partial user interface representations illustrating filtering based on user interaction with an interactive configuration of item images and/or interactive section 400. The initial configuration of the item configuration as illustrated in FIG. 4A includes a number of item images in an arrangement. For example, the ellipsis 404, which is similar to the ellipsis 302 of FIG. 3A, is a representation that indicates that the initial configuration may include any number of items. Additionally, as described above, ellipsis 404 may indicate that the illustrated dresses of FIG. 4A may be representative item images of other item images not chosen for presentation within the presentation area. Interactive configuration 400 may include a sort and/or group option 410. The sort option 410 may include multiple options to sort the items and/or item images based on attribute values or properties associated with the items and/or item images. As discussed above, non-limiting examples of sort options and/or attributes may include length, color, pattern, price, style, and/or any other property or metadata associated with the items and/or item images. For example, in some embodiments, the item data repository 112 may store item information associated with each item that includes a number of attribute types (such as color, size, pattern, weight, page count and/or others) and corresponding attribute values. The stored attribute types for a given item may depend on the type of item. For example, a clothing item may not have an attribute value stored for a "page count" attribute type, while a book item may have such an attribute value stored.

The filter interaction service may sort the item images based on the selected option. In the example interactive configuration 400, the length option may be selected. As a result, the filter interaction service may sort the item images (here dress images) based on a length attribute type and/or value that may be stored in the item data repository 112 and/or the filter data repository 134. In some embodiments, item images may be sorted based on properties that are dynamically determined. For example, the length of a dress (an attribute value) may be dynamically determined through using one or more image detection, color detection, vector tracing, feature extraction, and/or processing techniques. For example, as depicted in FIG. 4A, the item images may include images of models and/or figures wearing the item (here a dress). The filter interaction service or some other service may detect an amount of skin or non-item color and/or pattern to dynamically determine the length and/or size of an item. Similarly, a color and/or pattern sort may be determined automatically.

Figure 4B:
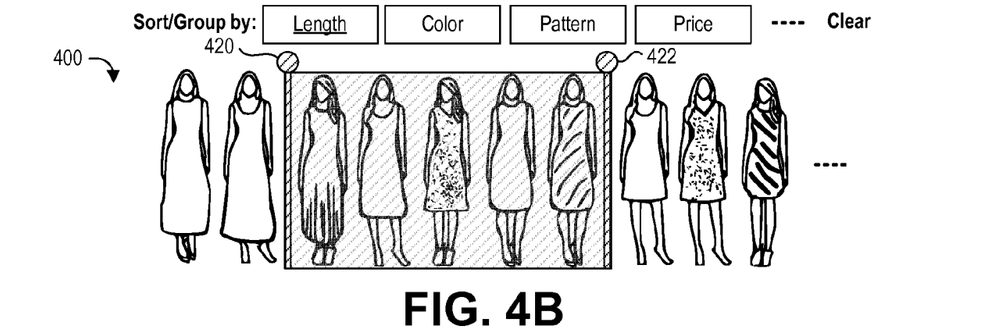

As illustrated in FIG. 4B, a range of item images may be selected. For example, beginning filter range 420 and/or ending filter range 422 may be selected by the user. In some embodiments, the selection of the range of item images may occur by a tap and hold, one or more mouse clicks, multi-touch gesture, or the like. An input instrument for the filter selection can be a finger, stylus, or combination of fingers for a multitouch gesture in some embodiments. An indication of the selection input can be detected or received by the user input component 124. Though discussed as implemented in a device equipped with touch-sensitive technology, other embodiments can be implemented in systems responding to other types of user input such as mouse clicks, key presses, input wheel rotation, etc. In some embodiments, the beginning filter range 420 and ending filter range 422, also known as a slider element, may be selectable as an entire element to update both the beginning filter range 420 and ending filter range 422 in response to a single continuous user interaction (e.g., by dragging and/or scrolling the slider element).

The determination of the filter range may be based at least in part on the beginning filter range 420 and/or ending filter range 422. For example, items and/or item images to the left of the beginning filter range 420 and/or items and/or item images to the right of the ending filter range 420 may be determined to be outside of the filter range. In other words, the beginning filter range 420 and/or ending filter range 422 may define the subset of items and/or item images to be within the filtered range.

Figure 4C:
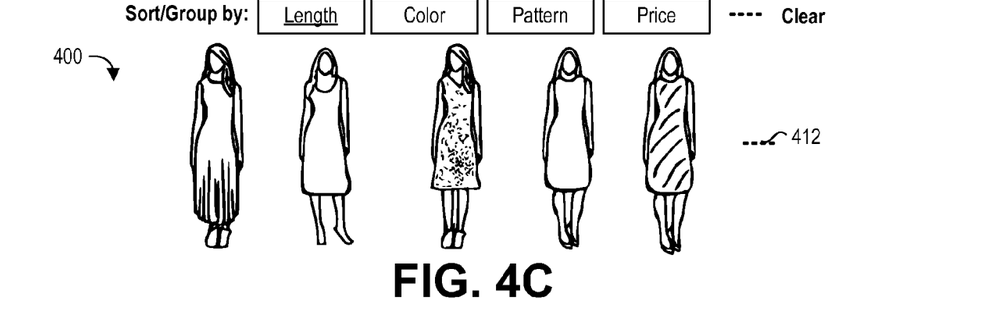

As illustrated in FIG. 4C, interactive configuration 400 may automatically update based at least in part on the filter range selection. For example, where the initial configuration of FIG. 4A and/or FIG. 4B included ten or more item images, updated interactive configuration 400 may display five item images. As described above, representative item images may be used and, therefore, ellipsis 412 may indicate that the illustrated dresses of FIG. 4C may be representative images corresponding to groups of additional item images that are presented following the filter selection (although only illustrated by ellipsis 412). Additionally, as described above, the representative item images may be associated with attribute values that are representative of attribute values of a group or set of items, rather than presenting images of all items in the set or group. For example, representative attribute types of FIG. 4C may include dress length, color, pattern, and/or price. Thus, additional dresses may be displayed of similar length, color, pattern, and/or price following the filter selection. The filtered item images may correspond to the range selection of FIG. 4B. In some embodiments, in response to a selection of a filter range, the interactive configuration 400 of item images may automatically resize. As illustrated in FIG. 4C, the item images may expand and/or scale in length and/or width. For example, the item images may expand and/or scale to fit the current display area. Such an increase and/or resize may be useful to the user to view the item images easier and/or enhance the user experience. In some embodiments, an update of the filter range of the interactive configuration 400 may automatically update a corresponding item display area. For example, the item display section 330 of FIG. 3A may update to match and/or correspond to the filtered item images of interactive configuration FIG. 4C. Thus, a user may filter items for display in another portion of a user interface based on selections in the interactive configuration 400.

Figure 4D:
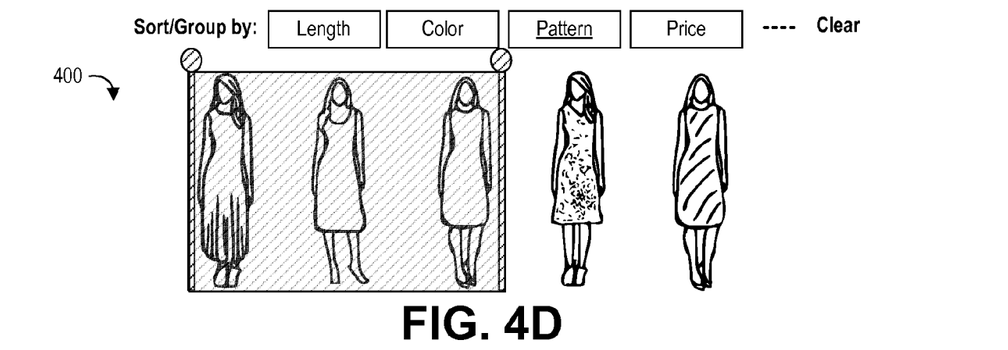

As illustrated in FIG. 4D, a user may perform a number of subsequent interactions, according to some embodiments. For example, a user may subsequently select another sort option. In the example, sort option 410 has been selected by the user to sort by pattern of dresses. As illustrated, the filter interaction service sorts the items previously displayed in FIG. 4C based on pattern. As previously discussed, an attribute or attribute value (such as a pattern) may be stored as metadata and/or may be calculated dynamically. A user may subsequently select another filter range. For example, the filter range of FIG. 4D may include a subset of the item images of FIG. 4C. In some embodiments, the user may continue selecting filter ranges until a minimum item display threshold is reached and/or one item image is left. In some embodiments, a user may undo item filter range selection. For example, the item filter selection that resulted in the filtered item images of FIG. 4C may be undone to result in the item images as illustrated in FIG. 4A. In some embodiments, a "breadcrumb" history may be implemented such that a user may undo one or more filter ranges in the order that the one or more respective filter ranges were selected and/or applied.

FIGS. 5A-D illustrate another example of a sequence of partial user interface representations illustrating filtering based on user interaction with an interactive configuration of item images and/or interactive section 500. As illustrated, the sequence of partial user interface representations of FIG. 5A-D includes many interactions and/or elements similar to the sequence of partial user interface representations of FIG. 4A-D. As illustrated, interactive configuration 500 may include slices and/or full-size item images. In some embodiments, full-sized item images may be displayed based at least in part on a user selection. For example, as beginning and/or ending filter points are selected, item images corresponding to those points and/or within the range of those points may be expanded and/or displayed as full-size item images.

Figure 5A:
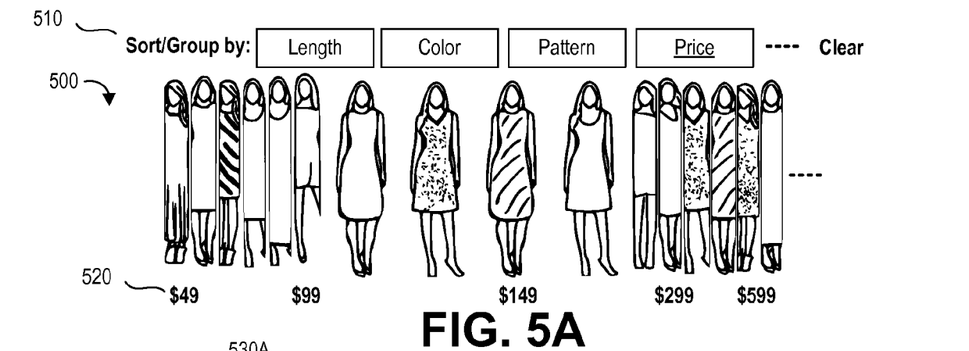
FIGS. 5A-D illustrate another example sequence of partial user interface representations illustrating filtering based on user interaction with an interactive configuration of item images, according to some embodiments.

As illustrated in FIG. 5A, the sort option 510 of price may be selected. As a result, the filter interaction service may sort the item images (here dress images) based on a price attribute value associated with each item, which may be stored in the item data repository 112 and/or the filter data repository 134. As illustrated, label, property, and/or price markers 520 may be displayed. The price markers 520 may correspond to the prices of one or more respective items adjacent to each marker. For example, the dresses nearby the price marker of "$49" may be priced near forty-nine dollars. The property and/or price markers 520 may be displayed on a relative scale. For example, the display area of dresses corresponding from "$49" to "$99" may be similar in size to the display area of dresses corresponding from "$299" to "$599" because a similar number of dresses may belong to each respective price category and/or bucket. The filter interaction service may dynamically determine the location of the property and/or price markers 520 based at least in part on the set of items and/or item images of the interactive configuration 500. In other embodiments, property and/or price markers 520 may be displayed on a linear scale. In some embodiments, the label, property, and/or price markers 520 may correspond to a histogram value. For example, the histogram value and/or representation may be a graph line, graph chart, graph bar, histogram chart, and/or some combination thereof. In the histogram example of markers, the values of the histogram may include the popularity of the item, number of purchases, ratings, and/or some other metadata associated with the items. Furthermore, the histogram markers may be superimposed over the item images and/or displayed below or otherwise adjacent to the item images.

Figure 5B:
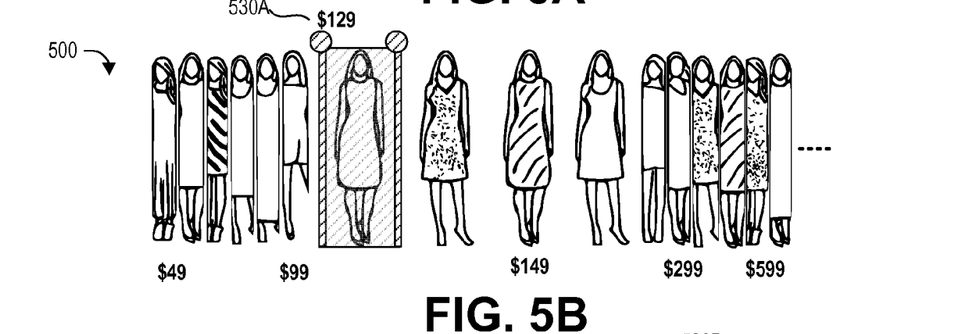
Figure 5C:
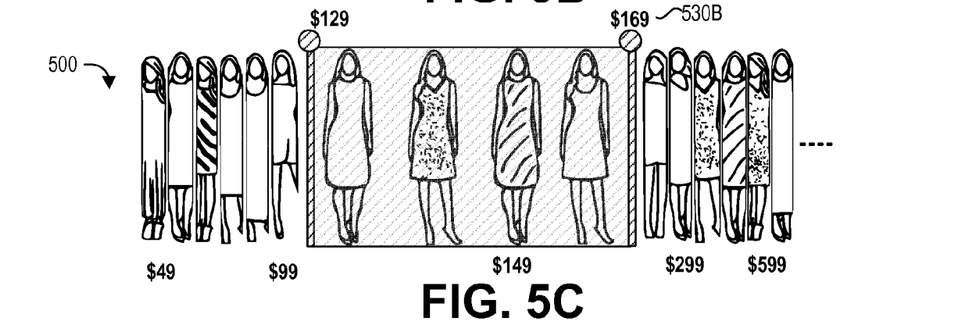

As illustrated in FIGS. 5B and 5C, additional price and/or property markers 530A and 530B may be displayed corresponding to a selected range of item images. For example, in response to a beginning filter range selection, a beginning price marker 530A may be displayed. The beginning price marker 530A may correspond to the price of the beginning item image, here "$129." Similarly, as illustrated in FIG. 5C, in response to an ending filter range selection, an ending price marker 530B may be displayed (here "$169").

Figure 5D:
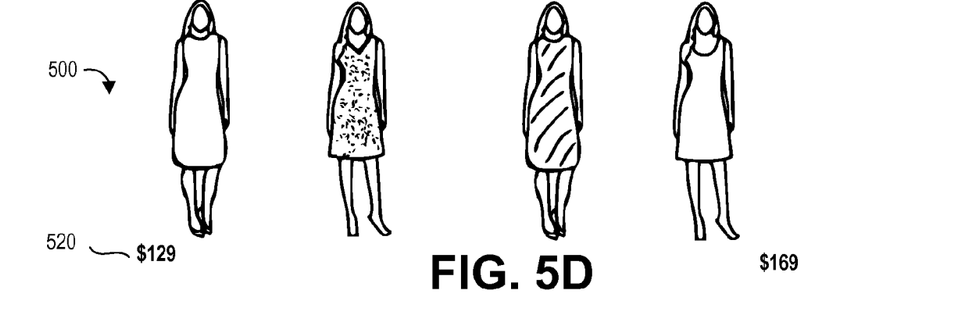

As illustrated in FIG. 5D, the property and/or price markers 520 may automatically update to correspond to the most recent filter selection. For example, price markers 520 start at "$129," which may correspond to the lowest priced dress of the current item images displayed in the interactive configuration 500.

In some embodiments, as illustrated in FIG. 5D, as item filter selections reduce the number of item images that need to be displayed, full-sized images may be displayed instead of slices.

Figure 6A:
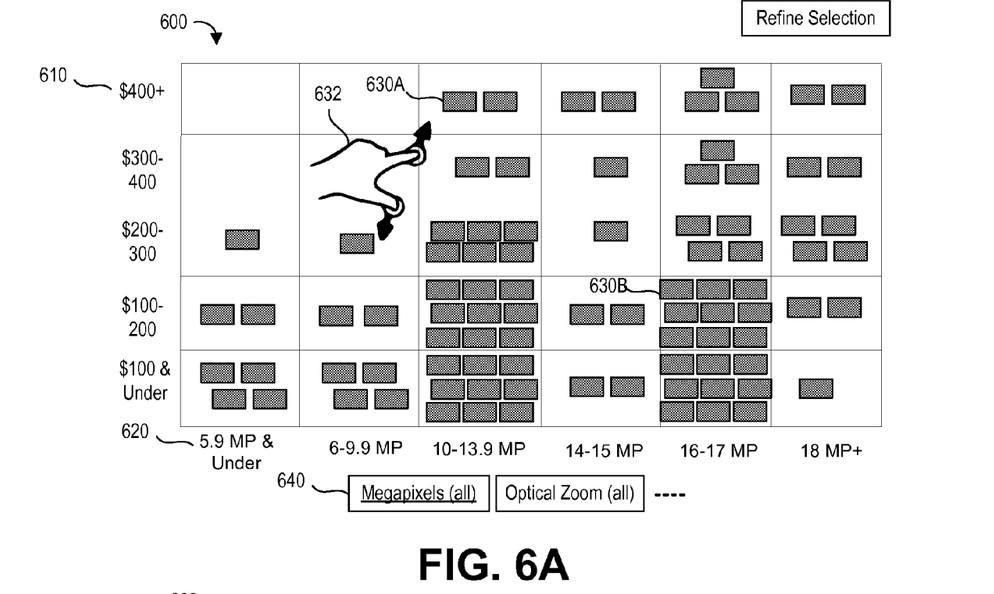
FIGS. 6A-B illustrate an example sequence of partial user interface representations illustrating two-dimensional filtering based on user interaction with an interactive configuration of item images, according to some embodiments.
Figure 6B:
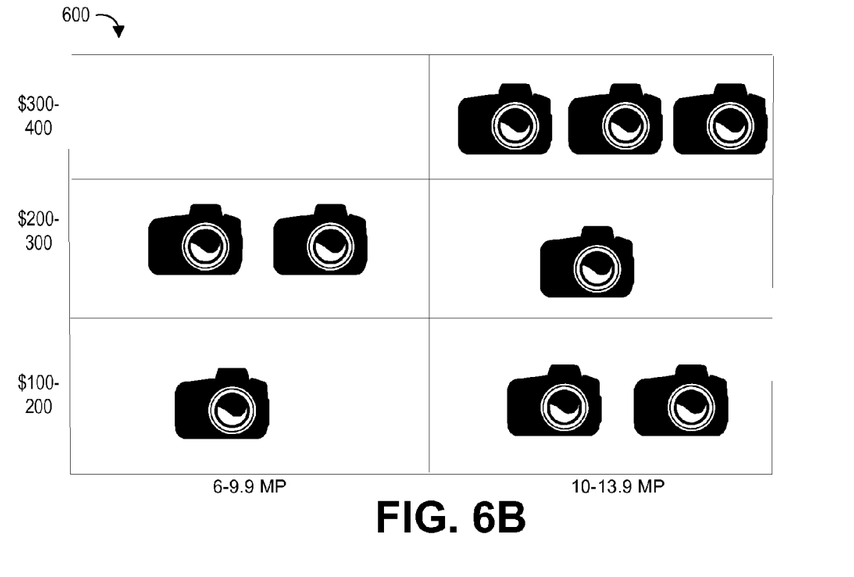

FIGS. 6A-B illustrate another example of a sequence of partial user interface representations illustrating filtering based on user interaction with an interactive configuration of item images and/or interactive section 600. The initial configuration of the item configuration as illustrated in FIG. 6A includes a number of items grouped by orthogonal axes and/or presented in a grid. Benefits of two-dimensional filtering by item attributes include presenting quantitative aspects of items such as processing power, display size, and/or other desirable features on one axis simultaneously with another axis such as price. Thus, a user may quickly view desirable features in conjunction with corresponding price ranges. For example, in a two-dimensional presentation grid, a user may quickly ascertain that cameras above ten megapixels and under one hundred dollars are not available. As used herein, "two-dimensional" filtering refers to filtering based at least in part on two or more attribute types and not merely that two-dimensional images are being filtered or that more than one row of items is presented.

The axes may correspond to one or more attributes and/or attribute types of the items. For example, vertical axis 610 may correspond to a price axis and/or the horizontal axis 620 may correspond to a selectable quantitative attribute. The vertical axis 610 and/or the horizontal axis 620 may include labels corresponding to the one or more attributes and/or attribute types of the items. As illustrated, the axes may be sorted in a numerical and/or other order. For example, sorting and/or grouping may be by brand and/or brand name in alphabetical order. Item blocks 630 may correspond to and/or represent the number of items presented at a particular intersection. For example, the blocks 630A may represent the number of items (here cameras) at the intersection of a price over $400 and between 10 and 13.9 megapixels. Blocks 630B may be greater than block 630A, which may represent that there are more items at the intersection corresponding to blocks 630B than the number of items at the intersection corresponding to blocks 630A.

In some embodiments, item blocks 630 may correspond to item images, instead of representative images, such as blocks, dots, circles, or the like. The item image presented in a given item block, in some embodiments, may be a representative item selected from a group of items at or near the given intersection of attribute values.

One or more of the axes may be updated based on a selection of an axis selector 640. In the example embodiment, the horizontal axis 620 may be updated in response to a selection of an axis selector 640. For example, while browsing camera items, a user may select to filter and/or view cameras grouped by megapixels, optical zoom, user rating, and/or any other attribute or metadata corresponding to the items. As illustrated, the horizontal axis of the presentation grid corresponds to groupings by megapixels. If a user were to select axis selector 640 with an optical zoom option, then horizontal axis 620 may update to groupings based on optical zoom attributes of the items.

With a two axes interactive configuration, items may be filtered relative to two attributes. For example, with user input interaction 632 (such as pinch and/or zoom here), the filter interaction service may receive filter requests corresponding to the first and second axes. The user input interaction 632 may occur via one or more input instruments such as a finger, mouse (such as a click or double-click), or combination of fingers for a multitouch gesture in some embodiments. In some embodiments, user input interaction 632 may be an interaction other than the illustrated pinch and/or zoom. For example, user input interaction 632 may be with respect to a user interface element such as a double slider. In a double slider example, each axis may include selectable endpoints and/or a slider element, which may be interacted with by the user. Furthermore, each slider element may be further selectable with an adjustable elevator, scrolling element and/or interaction, and/or some other mechanism to move the slider. In response to the user input interaction 632, the filter interaction service may update the interactive configuration 600, as described below with reference to FIG. 6B.

As illustrated in FIG. 6B, the interactive configuration 600 may update in response to the user input interaction 632 of FIG. 6A. In some embodiments, a greater and/or lesser zoom and/or maximization may occur based on the degree and/or some other quantitative aspect of the user input interaction 632. For example, a greater and/or wider zoom interaction 632 may result in a greater zoom of the presentation grid. An indication of the zoom interaction 632 may have been received by the filter interaction service to update the presentation grid to narrow the items for presentation. As illustrated, "zoomed in" item images 630A of FIG. 6B may correspond to the blocks 630A of FIG. 6A. As will be appreciated, user input interaction 632 may include zooming out and/or pinching to undo previous filters and/or show more items for presentation.

In some embodiments, a hover, tap, and/or click of an item image may display greater details corresponding to the item and/or item image. For example, greater details may include a pop-up and/or additional display of details related to the selected item and/or item image such as a larger item image, item title, user ratings, and/or any other attribute or property associated with the item.

In some embodiments, additional axis selectors 640 may be selected following previously selected axis selectors and/or filtered items. For example, FIGS. 6A-B illustrate a filtering of cameras based on two or more attributes, such as price and/or megapixels. The axis selector 640 of FIG. 6B may be selected to optical zoom. The presentation grid of FIG. 6B may update the horizontal axis 620 to correspond to optical zoom units. Additionally, the update of the horizontal axis may apply to the already filtered items, such as the items being filtered based on price and/or megapixels.

Although the images and reduced representations described herein are generally discussed in the context of a two-dimensional graphics and/or images, it will be appreciated that the efficient filtering of items through interaction with item images can be applied to images displayed within a three-dimensional image space as well. For example, some systems may display three-dimensional representations of items or other objects to users on a two-dimensional display. Other systems may display three-dimensional representations of objects using a volumetric display, for example, a stereoscopic, autostereoscopic, or multiscopic display. The data units of the three-dimensional images can be represented by one or more of voxels, polygons, or points within a point-cloud.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for interactively filtering a plurality of items for presentation, the system comprising:
   an electronic data store configured to at least store a plurality of images, each image of the plurality of images associated with an item of a plurality of items; and
   a computing system comprising one or more hardware computing devices executing specific computer-executable instructions, said computing system in communication with the electronic data store, and configured to at least:
      retrieve a first set of images from the plurality of images for presentation, each image of the first set of images associated with an item from a first set of items;
      determine a first sorted order for the first set of images relative to a first attribute type, wherein the first sorted order is determined based at least in part on a respective attribute value of the first attribute type for each item of the first set of items;
      generate a presentation configuration comprising the first set of images in the first sorted order;
      detect an indication of user input with respect to the presentation configuration, wherein the user input corresponds to a range selection of a start image and an end image;
      in response to the detected indication, determine a second set of items, from the plurality of items, based at least in part on the range selection of the start image and the end image, wherein determining the second set of items further comprises:
         determining an additional item, from the plurality of items, having an attribute value between respective attribute values associated with the start image and the end image and not having an associated image included in the first set of images;
      determine a second set of images for presentation, each image of the second set of images corresponding to an item from the second set of items, the second set of images including an image corresponding to the additional item; and
      update the presentation configuration to only include the second set of images.

2. The system of claim 1, wherein the computing system is further configured to at least:
   detect a second indication of second user input with respect to the presentation configuration, wherein the second user input corresponds to a range selection of a second start image and a second end image;
   in response to the second detected indication, determine a second subset of the plurality of images based at least in part on the range selection of the second start image and the second end image; and
   update the presentation configuration to include only the second subset of the plurality of images.

3. The system of claim 1, wherein the computing system is further configured to at least:
   determine a plurality of label markers, each label marker of the plurality of label markers identifying an attribute value associated with an image of the plurality of images; and
   update the presentation configuration to include the plurality of label markers.

4. The system of claim 1, wherein the computing system is further configured to at least:
   update the presentation configuration to include the plurality of images in the first sorted order in response to an indication of a user request to undo the range selection corresponding to the start image and the end image.

5. The system of claim 1, wherein the presentation configuration comprises at least one cropped representation image.

6. The system of claim 1, wherein at least one attribute value of the first attribute type is calculated dynamically.

7. A computer-implemented method comprising:
   as implemented by one or more computing devices configured with specific executable instructions,
      determining a first set of items, from a plurality of items, to include in a presentation configuration;
      determining a first sorted order for the first set of items relative to a first attribute type, wherein the first sorted order is determined based at least in part on a respective attribute value of the first attribute type for each item of the first set of items;
      determining a first set of images for presentation, each image of the first set of images corresponding to an item from the first set of items;
      generating the presentation configuration comprising the first set of images according to the first sorted order;
      detecting a first indication of user input with respect to the presentation configuration, wherein the user input corresponds to a range selection of a first start image and a first end image from the first set of images;
      in response to the first detected indication, determining a second set of items, from the plurality of items, based at least in part on the range selection of the first start image and the first end image, wherein determining the second set of items further comprises:
         determining an additional item, from the plurality of items, having an attribute value between respective attribute values associated with the first start image and the first end image and not having an associated image included in the first set of image;
      determining a second set of images for presentation, each image of the second set of images corresponding to an item from the second set of items, the second set of images including an image corresponding to the additional item; and
      updating the presentation configuration to only include the second set of images.

8. The computer-implemented method of claim 7, further comprising:
   detecting a second indication of second user input with respect to the presentation configuration, wherein the second user input corresponds to a range selection of a second start image and a second end image from the second set of images;
   in response to the second detected indication, determining a third set of items, from the plurality of items, based at least in part on the range selection of the second start image and the second end image, wherein the third set of items has less items than the second set of items;
   determining a third set of images for presentation, each image of the third set of images corresponding to an item from the third set of items; and updating the presentation configuration to only include the third set of the images.

9. The computer-implemented method of claim 7, further comprising:
    determining a plurality of label markers, each label marker of the plurality of label markers associated with an image of the first set of images; and
    updating the presentation configuration to include the plurality of label markers.

10. The computer-implemented method of claim 8, further comprising:
    updating the presentation configuration to include the second set of images in response to an indication of a user request to undo the range selection corresponding to the second start image and the second end image.

11. The computer-implemented method of claim 7, wherein determining a first set of images for presentation includes selecting representative images based at least in part on the first sorted order.

12. The computer-implemented method of claim 7, wherein the presentation configuration comprises at least one cropped representation image.

13. The computer-implemented method of claim 7, wherein updating the presentation configuration further comprises updating an item display area corresponding to the second set of images.

14. The computer-implemented method of claim 7, wherein updating the presentation configuration further comprises expanding the second set of images to a width of a display area.

15. A computer-readable, non-transitory storage medium storing computer executable instructions that, when executed by one or more computing devices, configure the one or more computing devices to perform operations comprising:
    retrieving a first set of items, from a plurality of items, to include in a presentation configuration, each item from the first set of items associated with an image from a first set of images;
    determining a first sorted order for the first set of items relative to a first attribute type, wherein the first sorted order is determined based at least in part on a respective attribute value of the first attribute type for each item of the first set of items;
    generating the presentation configuration comprising the first set of images according to the first sorted order;
    detecting a first indication of user input with respect to the presentation configuration, wherein the user input corresponds to a range selection of a first start image and a first end image from the first set of images;
    in response to the first detected indication, determining a second set of items, from the plurality of items, based at least in part on the range selection of the first start image and the first end image, wherein determining the second set of items further comprises:
        determining an additional item, from the plurality of items, having an attribute value between respective attribute values associated with the first start image and the first end image and not having an associated image included in the first set of images;
    determining a second set of images for presentation, each image of the second set of images corresponding to an item from the second set of items, the second set of images including an image corresponding to the additional item; and
    updating the presentation configuration to only include the second set of images.

16. The computer-readable, non-transitory storage medium of claim 15, wherein the operations further comprise:
    detecting a second indication of second user input with respect to the presentation configuration, wherein the second user input corresponds to a range selection of a second start image and a second end image from the second set of images;
    in response to the second detected indication, determining a third set of items, from the plurality of items, based at least in part on the range selection of the second start image and the second end image, wherein the third set of items has less items than the second set of items;
    determining a third set of images for presentation, each image of the third set of images corresponding to an item from the third set of items; and
    updating the presentation configuration to only include the third set of the images.

17. The computer-readable, non-transitory storage medium of claim 16, wherein the operations further comprise:
    updating the presentation configuration to include the second set of images in response to an indication of a user request to undo the range selection corresponding to the second start image and the second end image.

18. The computer-readable, non-transitory storage medium of claim 15, wherein the operations further comprise:
    determining a plurality of label markers, each label marker of the plurality of label markers associated with an image of the first set of images; and
    updating the presentation configuration to include the plurality of label markers.

19. The computer-readable, non-transitory storage medium of claim 15, wherein updating the presentation configuration further comprises expanding the second set of images to a width of a display area.

20. The computer-readable, non-transitory storage medium of claim 15, wherein the presentation configuration comprises at least one cropped representation image.

* * * * *